United States Patent
Masutani

(10) Patent No.: US 8,579,371 B2
(45) Date of Patent: *Nov. 12, 2013

(54) SEAT BOTTOM PRETENSIONER FOR VEHICLE SEAT

(76) Inventor: Eiji Masutani, Shioya-gun (JP)

(*) Notice: Subject to any disclaimer, the term of this patent is extended or adjusted under 35 U.S.C. 154(b) by 539 days.

This patent is subject to a terminal disclaimer.

(21) Appl. No.: 12/529,121

(22) PCT Filed: Feb. 28, 2008

(86) PCT No.: PCT/JP2008/053575
§ 371 (c)(1),
(2), (4) Date: Dec. 3, 2010

(87) PCT Pub. No.: WO2008/108281
PCT Pub. Date: Sep. 12, 2008

(65) Prior Publication Data
US 2011/0121621 A1    May 26, 2011

(30) Foreign Application Priority Data

Feb. 28, 2007   (JP) .................................. 2007-050445
Oct. 2, 2007    (JP) .................................. 2007-258330

(51) Int. Cl.
*B60R 21/00*        (2006.01)
(52) U.S. Cl.
USPC ................ 297/216.16; 297/216.19; 297/480
(58) Field of Classification Search
USPC ............. 297/216.15, 216.16, 216.18, 216.19, 297/216.1, 480; 296/68.1
See application file for complete search history.

(56) References Cited

U.S. PATENT DOCUMENTS

| | | | | |
|---|---|---|---|---|
| 2,379,385 A * | 6/1945 | Styers | ...................... | 244/122 R |
| 4,687,251 A * | 8/1987 | Kazaoka et al. | .............. | 297/337 |
| 5,685,567 A * | 11/1997 | Koujiya et al. | ............... | 280/806 |
| 5,692,802 A * | 12/1997 | Aufrere et al. | ................ | 297/337 |
| 5,762,372 A * | 6/1998 | Koujiya et al. | ............... | 280/806 |
| 5,799,977 A * | 9/1998 | Miyazaki et al. | ............. | 280/806 |
| 6,050,635 A * | 4/2000 | Pajon et al. | ................ | 297/216.1 |
| 6,053,532 A * | 4/2000 | Wilkins et al. | ............... | 280/806 |
| 6,142,564 A * | 11/2000 | Pajela et al. | ............. | 297/216.18 |
| 6,203,107 B1 * | 3/2001 | Jonsson | ........................ | 297/337 |
| 6,227,563 B1 * | 5/2001 | Talisman | ...................... | 280/735 |
| 6,250,682 B1 * | 6/2001 | Betz et al. | ..................... | 280/806 |
| 6,250,720 B1 * | 6/2001 | Wier | ............................ | 297/468 |
| 6,302,481 B1 * | 10/2001 | Swann et al. | ............ | 297/216.18 |
| 6,435,592 B2 * | 8/2002 | Nilsson | ........................ | 296/68.1 |
| 6,648,409 B1 * | 11/2003 | Laporte | ...................... | 297/216.1 |
| 6,938,926 B2 * | 9/2005 | Edrich et al. | ................. | 280/806 |

(Continued)

FOREIGN PATENT DOCUMENTS

| | | | |
|---|---|---|---|
| JP | 2000247171 A | | 9/2000 |
| JP | 2003081055 A | * | 3/2003 |
| JP | 2005271890 A | | 10/2005 |
| JP | 2006240545 A | | 9/2006 |

*Primary Examiner* — David E Allred
(74) *Attorney, Agent, or Firm* — Browdy and Neimark, PLLC

(57) ABSTRACT

A vehicle seat comprises a reclinable seatback (2), a seat bottom (3) movable in a front-and-rear direction, a pretensioner (41) for moving the seat bottom (3) rearward, and brackets (21, 21) attached to a vehicle body. The seat bottom is attached to the brackets so as to move in the front-and-rear direction, the seatback is rotatably attached to the brackets, and the pretensioner moves the seat bottom relatively rearward with respect to the brackets. When the seat bottom is moved rearward by the pretensioner, a front portion of the seat bottom is moved upward.

15 Claims, 6 Drawing Sheets

(56) References Cited

U.S. PATENT DOCUMENTS

| | | | |
|---|---|---|---|
| 7,976,092 B2* | 7/2011 | Meredith et al. | 296/63 |
| 8,052,211 B2* | 11/2011 | Nilakantan | 297/216.12 |
| 8,434,819 B2* | 5/2013 | Guerrero | 297/216.16 |
| 2001/0011810 A1* | 8/2001 | Saiguchi et al. | 280/728.1 |
| 2001/0037908 A1* | 11/2001 | Motozawa et al. | 180/274 |
| 2002/0190515 A1* | 12/2002 | Birk et al. | 280/753 |
| 2003/0155801 A1* | 8/2003 | Tatematsu et al. | 297/480 |
| 2004/0051353 A1* | 3/2004 | Klukowski | 297/216.1 |
| 2010/0001559 A1* | 1/2010 | Masutani | 297/216.1 |
| 2011/0018316 A1* | 1/2011 | Meredith et al. | 297/216.1 |
| 2011/0089727 A1* | 4/2011 | Masutani | 297/216.1 |
| 2011/0156457 A1* | 6/2011 | Masutani | 297/216.1 |
| 2011/0198910 A1* | 8/2011 | Masutani | 297/480 |
| 2011/0210586 A1* | 9/2011 | Masutani | 297/216.1 |
| 2012/0112503 A1* | 5/2012 | Masutani | 297/216.1 |
| 2012/0139324 A1* | 6/2012 | Masutani | 297/470 |

* cited by examiner

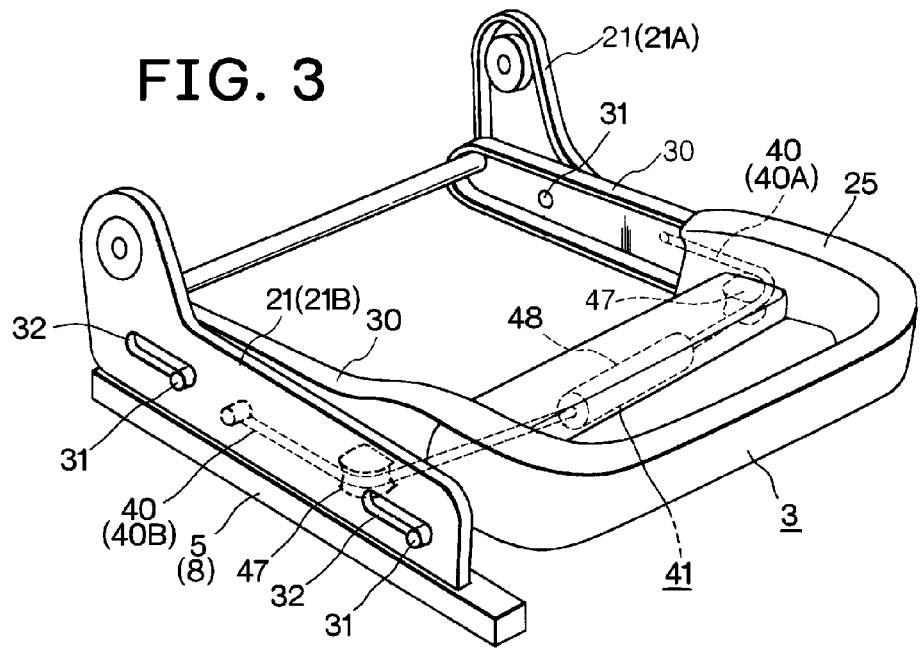
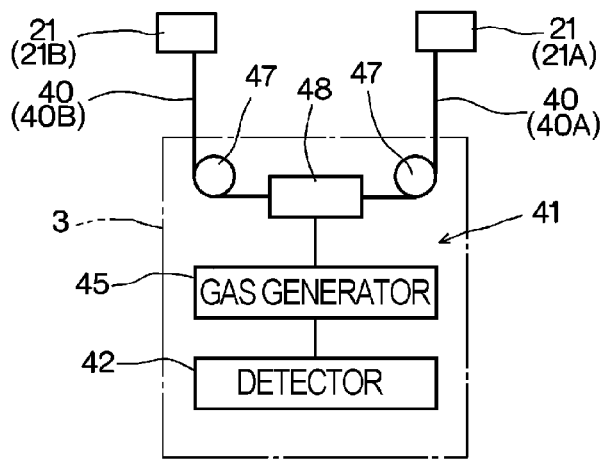
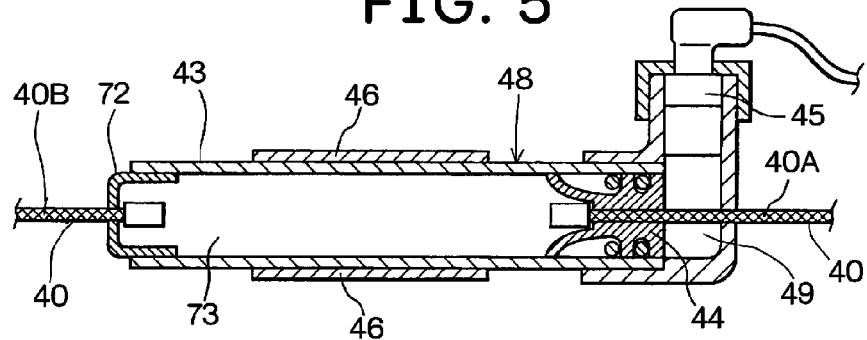

SEAT BOTTOM PRETENSIONER FOR VEHICLE SEAT

TECHNICAL FIELD

The present invention relates to a vehicle seat, and more particularly to a pretensioner for restricting an unpreferable forward movement of a seat occupant by rearwardly moving a seat bottom when large external force acts on a vehicle body by vehicle collision and the like.

BACKGROUND ART

Conventionally, there is known a pretensioner for restricting an unpreferable forward movement of a seat occupant by rearwardly moving a vehicle seat when a large external force acts on a vehicle body by vehicle collision and the like.

When a collision detector detects vehicle collision, the conventional mechanism moves a vehicle seat in its entirety, that is, a seat bottom and a seatback rearward.

Patent Document 1: JP 2001-130354 A1

DISCLOSURE OF THE INVENTION

The conventional mechanism is disadvantageous in that since the seatback moves rearward, the seatback is moved away from the seat occupant in vehicle collision.

Since the seatback moves rearward in vehicle collision, the conventional mechanism has a possibility that it comes into contact with a rear seat occupant.

Further, the conventional mechanism is disadvantageous in that a large accommodation space is necessary because it has many parts.

An object of the present invention is to provide a pretensioner for overcoming a disadvantage in that a seatback is moved away from a seat occupant by moving a seat bottom rearwardly independently of the seatback.

Another object of the present invention is to provide a pretensioner capable of smoothly moving a seat bottom rearward.

Further, still another object of the present invention is to provide a compact pretensioner.

BRIEF DESCRIPTION OF THE DRAWINGS

FIG. 3 is a perspective view showing a seat bottom and a seat bottom pretensioner of the vehicle seat;

FIG. 4 is a schematic view showing an outline of the pretensioner;

FIG. 5 is a sectional view showing a cable pull means of the pretensioner;

BEST MODE FOR CARRYING OUT THE INVENTION

Figure 1:
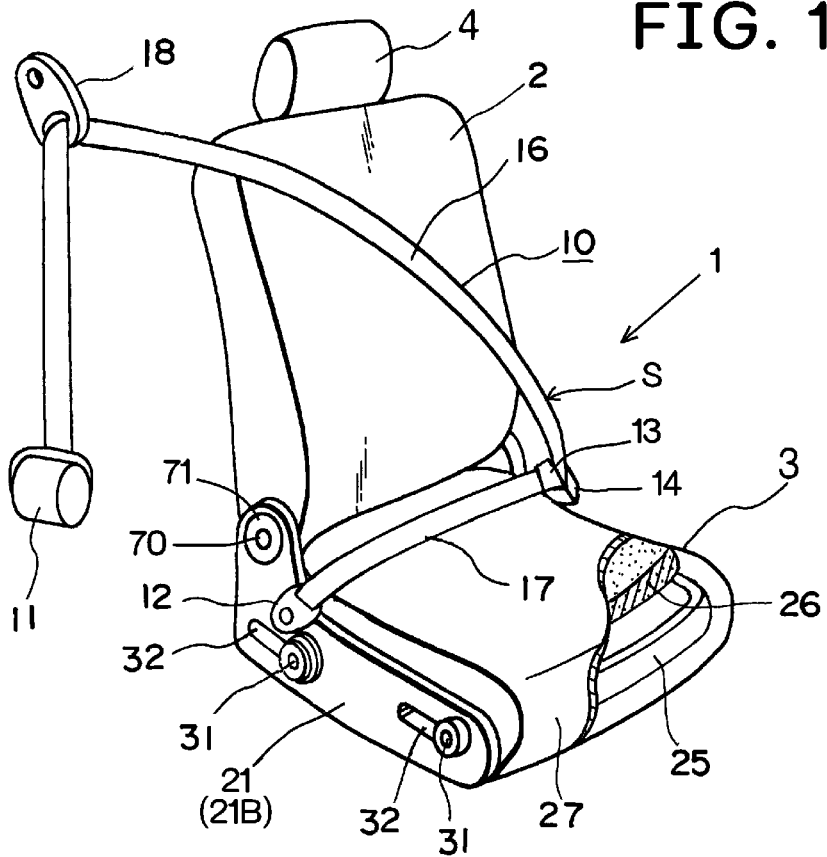
FIG. 1 is a perspective view showing a vehicle seat of the present invention.

A vehicle seat 1 according to an embodiment of the present invention has a rearward movable seat bottom 3, a seatback 2 and a headrest 4. The seat bottom 3 is preferably slidably attached to a vehicle body 6 (floor panel) through slide mechanisms 5.

The slide mechanisms 5 have lower rails 7, 7 fixed to the vehicle body 6 and upper rails 8, 8 slidably engaged with the lower rails 7, 7. The respective upper rails 8 are provided with standing brackets 21 to which the seatback 2 is rotatably supported by pivots 70. The seatback 2 is held at an arbitrary angle by reclining mechanisms 71.

The vehicle seat 1 has a seatbelt mechanism S. The seatbelt mechanism S has a seatbelt 10, a belt retractor 11 coupled with a base portion of the seatbelt 10, a tongue plate 13 attached to an intermediate portion of the seatbelt 10, a tongue anchor 14 with which the tongue plate 13 is detachably engaged, and a tip anchor 12 coupled with an extreme end of the seatbelt 10. When a strong inertia force acts on a seat occupant by a collision (hereinafter, called vehicle collision) caused by a traffic accident and the like, the belt retractor 11 regulates the seatbelt 10 from being pulled out and restricts the seat occupant for protection. The tongue plate 13 is position-adjustably attached to the seatbelt 10.

Figure 2:
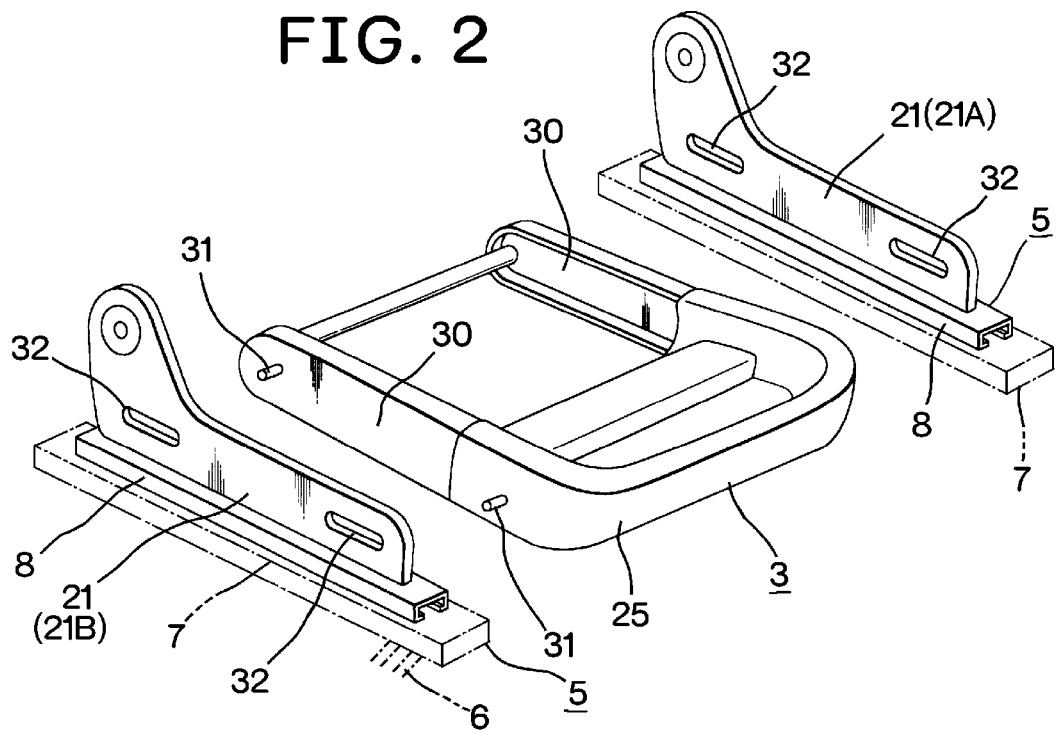
FIG. 2 is a perspective view showing a seat bottom frame and a slide mechanism of the vehicle seat.

In the embodiment shown in FIGS. 1 to 3, the tip anchor 12 and the tongue anchor 14 are fixed to the standing brackets 21, 21, respectively.

The seatbelt 10 is partitioned to a shoulder belt 16 between the belt retractor 11 and the tongue plate 13 and a wrap belt 17 between the tongue plate 13 and the tip anchor 12. The seatbelt mechanism S further has a through anchor 18 for supporting the shoulder belt 16. Although the through anchor 18 and the belt retractor 11 are generally connected to the vehicle body 6, it may be connected to the seatback 2.

The seat bottom 3 has a square frame-shaped seat bottom frame 25, a cushion 26 of urethane and the like attached to the frame 25, and a surface skin 27.

In the embodiment shown in FIGS. 1 to 3, respective side panels 30 of the bottom frame 25 have front and rear slide pins 31, 31 extending in a width direction of a seat, and the respective brackets 21 have substantially horizontal front and rear support slots 32, 32 extending in a front-and-rear direction of the seat. The seat bottom 3 is movably attached in the front-and-rear direction to the brackets 21 by inserting the slide pins 31 into the slots 32. As shown in FIGS. 7 to 10, the pins 31 may be connected to the brackets 21, and the slots 32 may be connected to the side panels 30.

The seat bottom 3 is ordinarily held at an ordinary position (refer to FIG. 3), at which the slide pins 31 are positioned on front sides in the slots 32, by a holding means (not shown) by a predetermined holding force. When a strong external force (an inertial force) equal to or larger than the predetermined holding force acts on the seat bottom 3, the holding means allows the seat bottom 3 to move rearwardly. The holding means can be composed of a spring means for urging the seat bottom 3 forward and a projecting means connected to the slots 32.

When the vehicle seat 1 is not provided with the slide mechanisms 5, the standing brackets 21, 21 are fixed to the vehicle body 6.

The vehicle seat 1 has a first pretensioner 41 for reducing a forward movement of the seat occupant when a vehicle collision occurs.

FIG. 4 shows a basic concept of the first pretensioner 41. The first pretensioner 41 has a collision detector 42 for detecting a vehicle collision, a gas generator 45 for generating gas in response to a signal from the collision detector 42, wire cables 40, 40 coupled with the standing brackets 21, 21, and a cable pull means 48 for pulling the wire cables 40, 40. The cable pull means 48 is preferably attached to the seat bottom 3.

When the collision detector 42 detects a vehicle collision, the gas generator 45 instantly supplies a large amount of gas to the cable pull means 48, which pulls the standing brackets 21, 21 through the wire cables 40, 40 by the expansion energy of the gas. At the same time, since the standing brackets 21, 21 do not move with respect to the vehicle body 6 due to a non-operation state of the slide mechanisms 5, the cable pull means 48 moves the seat bottom 3 relatively rearward with respect to the standing brackets 21, 21 against the holding force of the holding means. With this operation, even if forward inertia acts on the seat occupant during the vehicle collision, an amount of movement of the seat occupant in an unpreferable forward direction is reduced so that the seat occupant is safely protected by the seatback 2 and the seatbelt 10.

In the embodiment shown in FIGS. 1 to 3, the seatback 2 and the seatbelt 10 (the tip anchor 12 and the tongue anchor 14) are attached to the standing brackets 21, 21. Accordingly, the seat bottom 3 can move rearward independently of the seatback 2 and the seatbelt 10.

Preferable embodiments of respective portions of the first pretensioner 41 will be described. As shown in FIG. 5, the cable pull means 48 has a cylinder 43 and a piston 44 moving in the cylinder 43. As shown in FIG. 3, the cylinder 43 extends in a width direction of the seat 1 and is connected to a lower front portion of the seat bottom 3. An accommodation space can be relatively easily secured in the lower front portion of the seat bottom 3 without sacrificing comfort of the seat bottom 3. Since the cylinder 43 extends in a width direction, a large free space can be secured in a lower rear portion of the seat bottom 3. The free space provides a rear seat occupant with comfort by permitting him or her to insert their legs thereinto. A cylinder extending in a front-and-rear direction narrows a lower space of a rear portion of the seat bottom 3.

When the gas generator 45 is directly or indirectly coupled with an expansion chamber 49 of the cylinder 43 partitioned by the piston 44 and gas is supplied into the expansion chamber 49 from the gas generator 45, the piston 44 moves to the left in FIG. 5.

The wire cables 40 have a first cable 40A coupled with a first bracket 21A of the standing brackets 21 and a second cable 40B coupled with a second bracket 21B of the standing brackets 21. The other end of the first cable 40A is coupled with the piston 44, and the other end of the second cable 40B is coupled with a coupling cap 72 fixed to an open end of the cylinder 43. The coupling cap 72 does not have a hermetical seal performance and has a function for fixedly coupling the other end of the second cable 40B with the cylinder 43. A space 73 in the cylinder 43 between the coupling cap 72 and the piston 44 is a non-hermetically-sealed space opened externally and used as a moving space of the piston 44.

The wire cables 40, 40 extend externally along an axial direction (the width direction of the seat) of the cylinder 43 from the cable pull means 48, respectively, are guided rearward by rollers 47, 47 connected to the side panels 30,30, and are coupled with the standing brackets 21, 21.

The cylinder 43 is attached to the seat bottom 3 by a guide member 46 so that it is free to move in its length direction. Note that since the cylinder 43 is substantially supported by the cables 40A, 40B on both the sides thereof, the guide member 46 may be omitted.

When the gas generator 45 supplies a great amount of gas to the expansion chamber 49 due to a vehicle collision, the piston 44 is pushed out to the left with respect to the cylinder 43 in FIG. 5. What is important here is that the cylinder 43 of the present invention can move in the width direction with respect to the seat bottom 3. Therefore, the large amount of gas supplied to the expansion chamber 49 pushes the piston 44 out to the left with respect to the cylinder 43 and, at the same time, moves the cylinder 43 to the right with respect to the piston 44. In other words, the piston 44 and the cylinder 43 are moved in opposite directions from one another by the reaction force thereof.

Figure 6:
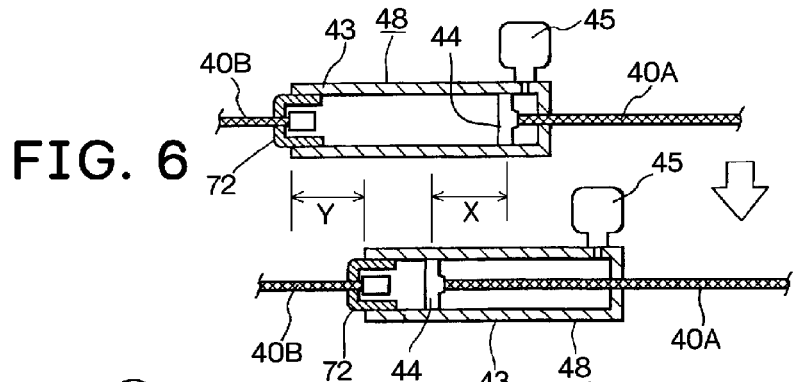
FIG. 6 is a comparison view showing a state of the pretensioner before it is operated and a state of the pretensioner after it is operated.
Figure 7:
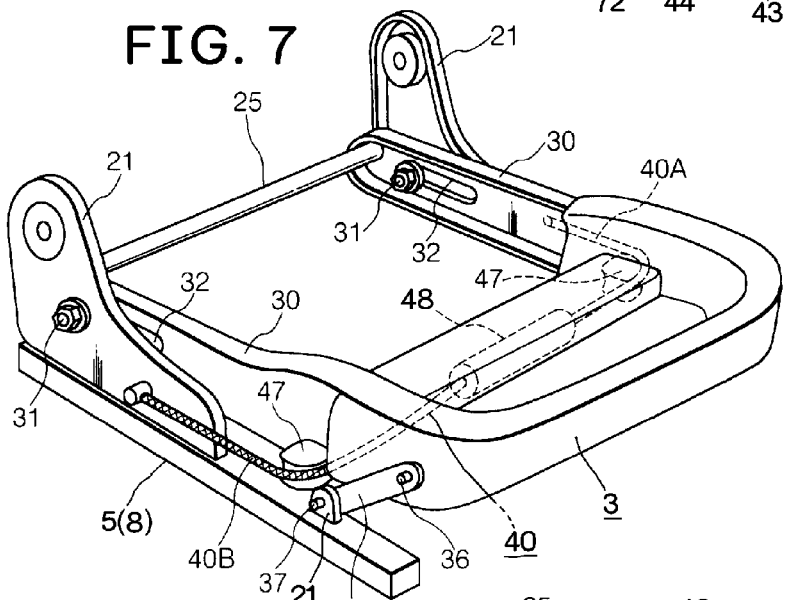
FIG. 7 is a perspective view showing an improved embodiment in which a front portion of the seat bottom can move upward.
Figure 8:
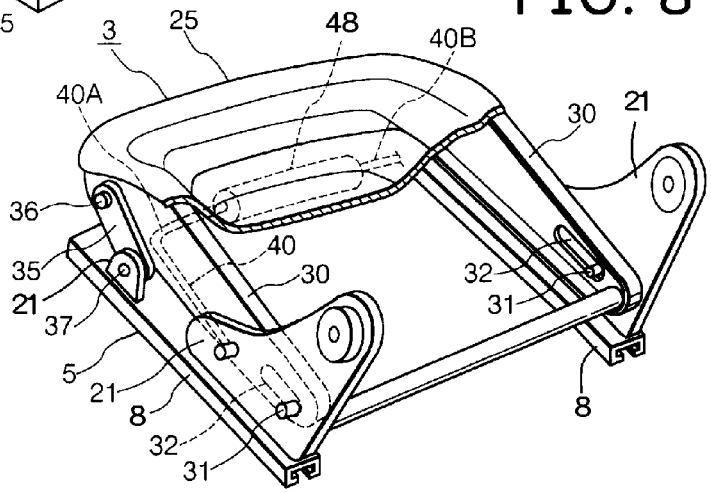
FIG. 8 is a perspective view showing the improved embodiment in which the front portion of the seat bottom can move upward.

FIG. 6 shows a state that gas causes the piston 44 and the cylinder 43 to move. When the large amount of gas is supplied to the expansion chamber 49, the piston 44 and the cylinder 43 change from a state before the vehicle collision occurs as shown above in FIG. 6 to a state after the vehicle collision occurs as shown below in FIG. 6. As shown in FIG. 6, gas energy moves the piston 44 to the left by a distance X to thereby draw the first bracket 21A through the first cable 40A. Further, the gas energy moves the cylinder 43 to the right by a distance Y to thereby draw the second bracket 21B through the second cable 40B. As a result, the gas energy relatively moves the seat bottom 3 rearward with respect to the standing bracket (the vehicle body 6).

In the present invention, since the seat bottom 3 moves rearward independently of the seatback 2, the seatback 2 is prevented from being collided against the rear seat occupant.

In the present invention, since the seat bottom 3 moves rearward independently of the seatback 2, the gas energy prevents the seatback 2 from being actively moved away from the seat occupant.

In the present invention, since one unit of gas energy can be transmitted to the first bracket 21A and the second bracket 21B substantially at the same time, the seat bottom 3 can be smoothly moved rearward. When a right side and a left side of the seat bottom 3 are independently moved by a different unit of energy, it is difficult to stabilize a direction and an attitude of the seat bottom 3.

In the present invention, since the piston 44 and the cylinder 43 are moved by the reaction force thereof, the moving distance X of the piston 44 becomes substantially the same as the moving distance Y of the cylinder 43. Accordingly, the seat bottom 3 can be smoothly moved.

In the present invention, since the piston 44 and the cylinder 43 are moved in an opposite direction, a moving space of the piston 44 and the cylinder 43 can be easily secured. That is, the piston 44 of the present invention moves in the space 73 of the cylinder 43 without projecting externally of the cylinder 43.

In the present invention, since the seat bottom 3 can be moved by the single gas generator 45 and the single cable pull means 48, a manufacturing cost is less expensive.

In the present invention, since respective end portions of the first cable 40A and the second cable 40B extend in a length direction of the cylinder 43, the first cable 40A and the second cable 40B can be efficiently coupled with the piston 44 and the cylinder 43.

It is also possible to attach the cable pull means 48 to the vehicle body 6. In this case, the wire cables 40, 40 are coupled with the side panels 30, 30 in place of being coupled with the standing brackets 21, 21.

FIGS. 7 to 10 show an improved embodiment of a rearward movement of the seat bottom 3. A front portion of the seat bottom 3 is supported by link mechanisms so that it can move upward when the seat bottom 3 is moved rearward in the vehicle collision.

Figure 9:
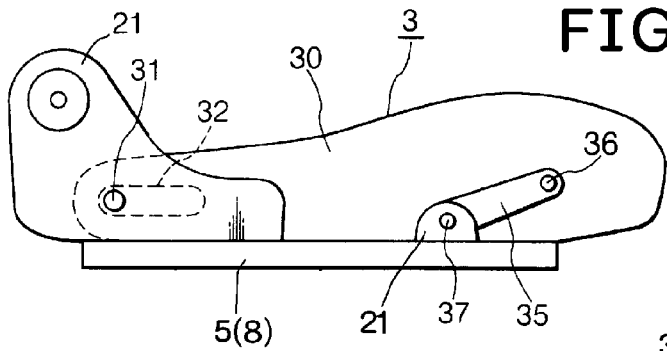
FIG. 9 is a side elevational view of the seat bottom before the pretensioner is operated.
Figure 10:
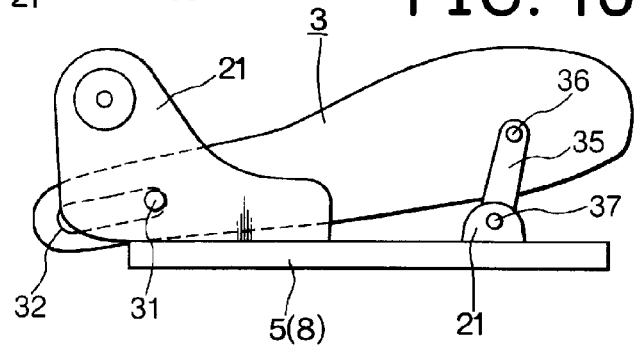
FIG. 10 is a side elevational view of the seat bottom after the pretensioner is operated.
Figure 11:
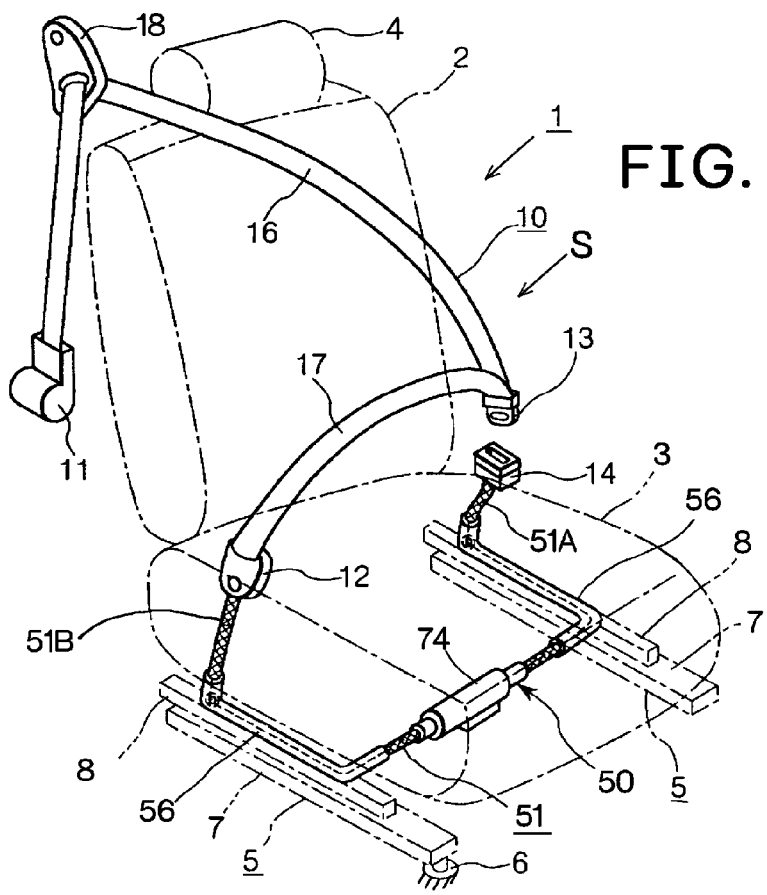
FIG. 11 is a perspective view showing a vehicle seat having a seatbelt pretensioner.

Each of the link mechanisms has an arm 35 including one end, which is rotatably coupled with a front portion of the side panel 30 of the seat bottom 3 by a shaft 36, and the other end rotatably coupled with the standing bracket 21 by a shaft 37. As shown in FIG. 9, the arm 35 inclines about 30° in an ordinary state, and when the seat bottom 3 moves rearward, the front portion of the seat bottom 3 is moved upward by the inclination as shown in FIG. 10.

When inertia is applied to the seat occupant by the vehicle collision, his or her femur crushes a front portion of the cushion 26 of the seat bottom 3 and moves downward. However, in the improved embodiment, since the front portion of the seat bottom 3 moves also upward, it efficiently supports the seat occupant's femur and suppresses the seat occupant from moving forward.

A vehicle the seat 1 shown in FIGS. 11 to 14 has a second pretensioner 50 for reducing a forward movement of a seat occupant by actively tensing a seatbelt 10 when a vehicle collision occurs.

Figure 12:
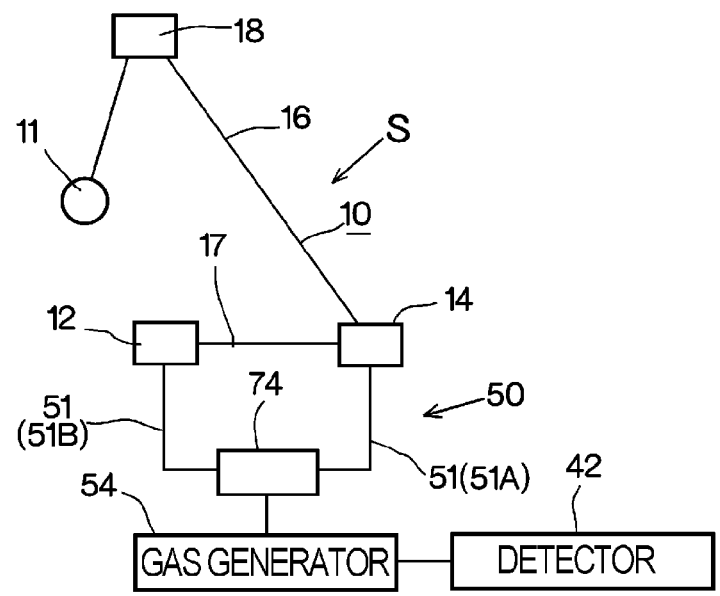
FIG. 12 is a schematic view showing an outline of a seatbelt mechanism and the seatbelt pretensioner of the vehicle seat.

FIG. 12 shows a basic concept of the second pretensioner 50. The second pretensioner 50 has a gas generator 54 for generating gas in response to a signal from a collision detector 42, wire cables 51 coupled with a tongue anchor 14 and a tip anchor 12, and a cable pull means 78 for pulling the wire cables 51.

When the collision detector 42 detects vehicle collision, the gas generator 54 instantly supplies a large amount of gas to the cable pull means 74, and the cable pull means 74 moves the tongue anchor 14 and the tip anchor 12 through the wire cables 51 by expansion energy of the gas to thereby actively tense the seatbelt 10. The seat occupant is more promptly restricted by the seatbelt 10 so that unpreferable forward movements of the seat occupant can be reduced.

What is important here is that the second pretensioner 50 moves both the tongue anchor 14 and the tip anchor 12. Moving both the tongue anchor 14 and the tip anchor 12 can more promptly and more strongly tense the seatbelt 10 than moving one of them.

Further, it is also important that the second pretensioner 50 moves both the tongue anchor 14 and the tip anchor 12 substantially at the same time. A simultaneous movement can restrict the seat occupant in a more stable attitude than a non-simultaneous movement or a one-side movement. Here, the term "substantially at the same time" means to set no conscious time difference.

The second pretensioner 50 becomes substantially the same as the first pretensioner 41. The cable pull means 74 of the second pretensioner 50 has a cylinder 52 which extends in a right-left direction of a vehicle body, and a piston 53 which moves in the cylinder 52. The cable pull means 74 is connected to the vehicle body 6 in a lower front portion of the seat bottom 3. An accommodation space can be relatively easily secured in the lower front portion of the seat bottom 3 without sacrificing comfort of the seat bottom 3.

Figure 13:
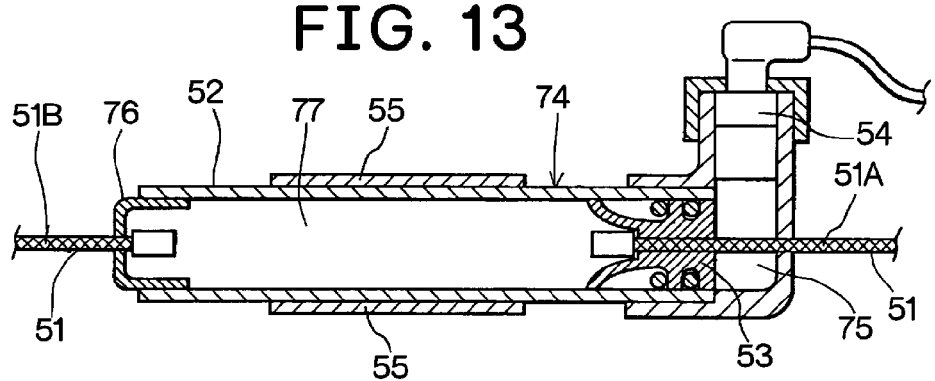
FIG. 13 is a sectional view showing a cable pull means of the seatbelt pretensioner.

When a gas generator 54 is directly or indirectly coupled with an expansion chamber 75 of the cylinder 52 partitioned by the piston 53 and gas is supplied into the expansion chamber 75 from the gas generator 54, the piston 53 moves to the left in FIG. 13.

The wire cables 51 have a first cable 51A coupled with the tongue anchor 14 and a second cable 51B coupled with the tip anchor 12. The other end of the first cable 51A is coupled with the piston 53, and the other end of the second cable 51B is coupled with a coupling cap 76 fixed to an open end of the cylinder 52. The coupling cap 76 does not have a hermetical seal performance and has a function for fixedly coupling the other end of the second cable 51B with the cylinder 52. A space 77 in the cylinder 52 between the coupling cap 76 and the piston 53 is a non-hermetically-sealed space opened externally and used as a moving space of the piston 53.

Figure 14:
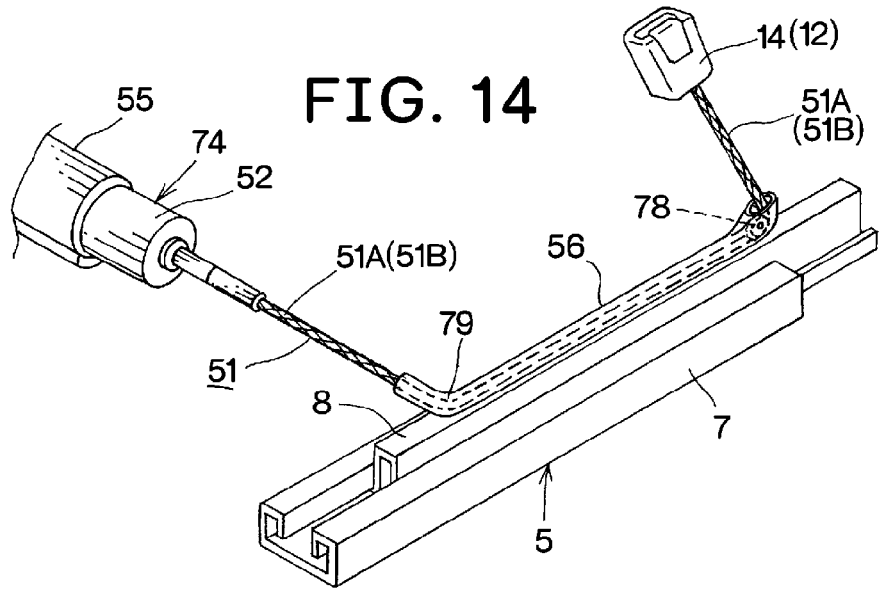
FIG. 14 is a perspective view showing a cable guide of the vehicle seat and a wire cable of the seatbelt pretensioner.

As shown in FIG. 14, a hollow cable guide 56, through which intermediate portions of the cables 51A, 51B pass, are connected to each of upper rails 8 of the slide mechanisms 5. The cable guide 56 extends in a front-and-rear direction, and a roller or a pulley 78 for guiding the cables 51A, 51B upward is connected to a rear end of the cable guide 56. Further, an inward curving portion 79 for guiding the cables 51A, 51B to a cable pull means 74 is connected to a front end of the cable guide 56.

The cylinder 52 is attached to a vehicle body 6 by a guide member 55 so that it is free to move in its length direction. Note that since the cylinder 52 is substantially supported by the cables 51A, 51B on both the sides thereof, the guide member 55 may be omitted.

Since the second pretensioner 50 becomes substantially the same as the first pretensioner 41, it has an operation/working effect similar to that of the first pretensioner 41 described in FIG. 6.

In the present invention, since the tongue anchor 14 and the tip anchor 12 can be moved by gas energy, the seatbelt 10 can be moved large distances.

In the present invention, since the tongue anchor 14 and the tip anchor 12 can be moved by the gas energy, the seatbelt 10 can be promptly moved.

In the present invention, since the tongue anchor 14 and the tip anchor 12 can be moved substantially at the same time by the gas energy, the seat occupant can be restricted in the stable attitude for protection.

In the present invention, since the piston 53 and the cylinder 52 are moved by the reaction force thereof, the moving distance X of the piston 53 becomes substantially the same as the moving distance Y of the cylinder 52. Accordingly, the seat occupant can be restricted in the stable attitude for protection. Here, the term "substantially the same" means that the moving distance is not consciously changed.

In the present invention, since the piston 53 and the cylinder 52 are moved in opposite directions, the moving space of the piston 53 and the cylinder 52 can be easily secured.

In the present invention, since the tongue anchor 14 and the tip anchor 12 can be moved by the single cable pull means 74, a manufacturing cost is less expensive.

In the present invention, since the tongue anchor 14 and the tip anchor 12 can be moved by the cable pull means 74, a manufacturing cost is less expensive.

In the present invention, since respective end portions of the first cable 51A and the second cable 51B extend in the length direction of the cylinder 52, the first cable 51A and the second cable 51B can be efficiently coupled with the piston 53 and the cylinder 52.

In the present invention, since the first pretensioner 41 and the second pretensioner 50 are provided, the forward movement of the seat occupant can be effectively reduced. Further, since the seat bottom 3 and the seatbelt 10 are moved by the independent mechanisms 41, 50, an amount of movement and a moving speed can be easily set or changed.

Figure 15:
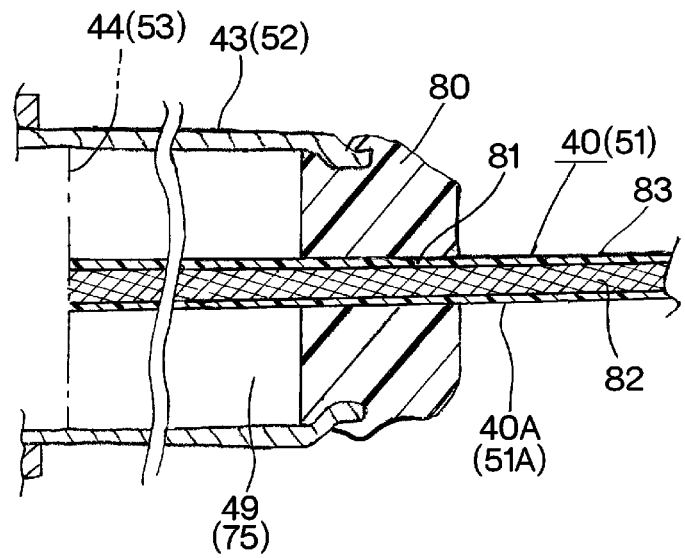
FIG. 15 is a sectional view showing the relation between a seal member of a cylinder of the cable pull means and the wire cable.

As shown in FIG. 15, a seal member 80 for hermetically sealing the expansion chamber 49 (75) is connected to an end of the cylinder 43 (52), and the cable 40A (51A) coupled with the piston 44 (53) extends externally of the cylinder 43 through a path 81 formed at a center of the seal member 80.

Figure 16:
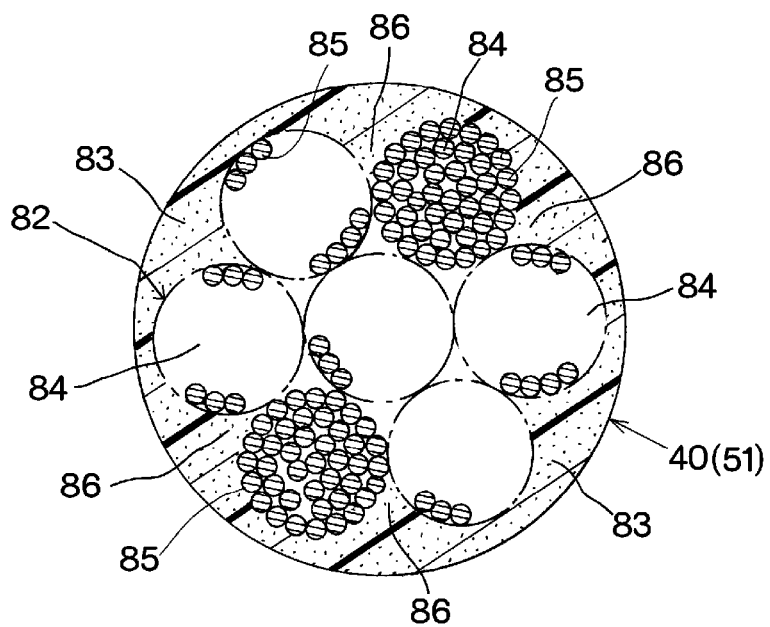
FIG. 16 is an enlarged sectional view of the wire cable.

As shown in FIG. 16, the wire cable 40 (51) has a metal cable 82 and a resin layer 83 coated on the periphery of the metal cable 82. The metal cable 82 is formed of a plurality of steel wire bundles 84, and each steel wire bundle 84 is composed of a plurality of steel wires 85. Many recesses 86 are formed around outer surfaces of the metal cables 82 and filled with the resin layer 83 so that an outer surface of the wire cable 40 (51) is made smooth.

The wire cable 40 (51) having the resin layer 83 has a high hermetical seal property to the path 81 to thereby prevent deterioration of the hermetic seal property of the expansion chamber 49 (75).

When a wire cable without a resin layer is inserted into the path 81 of the seal member 80, gaps due to many recesses are formed between the path 81 and the wire cable to thereby deteriorate the hermetic seal property of the expansion chamber 49 (75) so that gas energy leaks from the expansion chamber 49 (75).

The resin layer 83 is preferably formed around the outer periphery of the wire cable by powder coating, dipping, extrusion and the like. The resin layer 83 is formed to at least a part of the wire cable confronting the path 81.

The invention claimed is:

1. A vehicle seat comprising:
   a reclinable seatback,
   a seat bottom movable in a front-and-rear direction,
   a first pretensioner for moving the seat bottom rearward in a vehicle collision, and
   left and right brackets attached to a vehicle body,
   wherein the seat bottom is attached to the brackets so as to move in the front-and-rear direction, the seatback is rotatably attached to the brackets, and the first pretensioner moves the seat bottom relatively rearward with respect to the brackets,
   wherein the first pretensioner comprises:
   one cylinder;
   a piston movable in the cylinder;
   an expansion chamber of the cylinder partitioned by the piston; and
   one energy means for supplying gas to the expansion chamber,
   wherein the first pretensioner is attached to the seat bottom, one of the cylinder and the piston is coupled with the left bracket through a first cable, the other of the cylinder and the piston is coupled with the right bracket through a second cable, and the cylinder and the piston are moved in an opposite direction from each other by gas energy from the energy means.

2. The vehicle seat according to claim 1, wherein when the seat bottom is moved rearward by the first pretensioner, a front portion of the seat bottom is moved upward.

3. The vehicle seat according to claim 1, wherein the first pretensioner moves a left portion and a right portion of the seat bottom rearward substantially simultaneously by energy from one energy means.

4. The vehicle seat according to claim 1, wherein the cylinder is connected to the seat bottom so as to be free to move in a length direction of the cylinder.

5. The vehicle seat according to claim 1, wherein respective end portions of the first cable and the second cable coupled with the cylinder and the piston extend in a length direction of the cylinder.

6. The vehicle seat according to claim 1, wherein the cylinder is connected to a lower front portion of the seat bottom.

7. The vehicle seat according to claim 6, wherein a length direction of the cylinder is the same as a width direction of the seat bottom.

8. The vehicle seat according to claim 1, wherein the vehicle seat further includes a seatbelt mechanism having a seatbelt and a second pretensioner for actively tensing the seatbelt when a strong external force acts on the vehicle body due to a vehicle collision.

9. The vehicle seat according to claim 8, wherein the seatbelt mechanism includes:
   a tip anchor connected to one of left and right sides of the seat bottom and coupled with an extreme end of the seatbelt; and
   a tongue anchor connected to the other of the left and right sides of the seat bottom and engaged with a tongue plate connected to an intermediate portion of the seatbelt,
   wherein, when the vehicle collision occurs, the second pretensioner moves both the tip anchor and the tongue anchor and actively tenses the seatbelt.

10. The vehicle seat according to claim 1, wherein the first pretensioner includes:
    a seal member connected to an end of the cylinder;
    an expansion chamber partitioned between the piston and the seal member; and
    a wire cable coupled with the piston, wherein,
    the wire cable extends outside the cylinder through a path formed in the seal member, and
    a resin layer is formed around an outside surface of the wire cable to improve a hermetic seal property between the seal member and the wire cable.

11. A vehicle seat comprising:
    a reclinable seatback,
    a seat bottom movable in a front-and-rear direction,
    a first pretensioner for moving the seat bottom rearward in a vehicle collision, and
    left and right brackets attached to a vehicle body,
    wherein the seat bottom is attached to the brackets so as to move in the front-and-rear direction, the seatback is rotatably attached to the brackets, and the first pretensioner moves the seat bottom relatively rearward with respect to the brackets,
    wherein the first pretensioner comprises:
    one cylinder;
    a piston movable in the cylinder;
    an expansion chamber of the cylinder partitioned by the piston; and
    one energy means for supplying gas to the expansion chamber,
    wherein the first pretensioner is attached to the vehicle body, one of the cylinder and the piston is coupled with a left portion of the seat bottom through the first cable, the other of the cylinder and the piston is coupled with a right portion of the seat bottom through a second cable, and the cylinder and the piston are moved in an opposite direction from each other by gas energy from the energy means.

12. The vehicle seat according to claim 11, wherein the cylinder is connected to the vehicle body so as to be free to move in a length direction of the cylinder.

13. The vehicle seat according to claim 11, wherein the vehicle seat further includes a seatbelt mechanism having a seatbelt and a second pretensioner for actively tensing the seatbelt when a strong external force acts on the vehicle body due to a vehicle collision.

14. The vehicle seat according to claim 13, wherein the seatbelt mechanism includes:

a tip anchor connected to one of left and right sides of the seat bottom and coupled with an extreme end of the seatbelt; and a tongue anchor connected to the other of the left and right sides of the seat bottom and engaged with a tongue plate connected to an intermediate portion of the seatbelt, wherein, when the vehicle collision occurs, the second pretensioner moves both the tip anchor and the tongue anchor and actively tenses the seatbelt.

15. The vehicle seat according to claim 11, wherein the first pretensioner includes:

a seal member connected to an end of the cylinder;

an expansion chamber partitioned between the piston and the seal member; and a wire cable coupled with the piston, wherein, the wire cable extends outside the cylinder through a path formed in the seal member, and a resin layer is formed around an outside surface of the wire cable to improve a hermetic seal property between the seal member and the wire cable.

* * * * *